United States Patent
Mitsumori et al.

[11] Patent Number: 5,617,256
[45] Date of Patent: Apr. 1, 1997

[54] BIAXIAL ACTUATOR

[75] Inventors: Koji Mitsumori, Chiba; Hiroyasu Uchida, Kanagawa, both of Japan

[73] Assignee: Sony Corporation, Tokyo, Japan

[21] Appl. No.: 389,555

[22] Filed: Feb. 15, 1995

Related U.S. Application Data

[63] Continuation of Ser. No. 30,121, Mar. 15, 1993, abandoned.

[30] Foreign Application Priority Data

Mar. 19, 1992 [JP] Japan .................................. 4-093505

[51] Int. Cl.$^6$ .................................................. G11B 7/095
[52] U.S. Cl. ................................. 359/814; 369/244
[58] Field of Search ................. 369/244, 44.15–44.18, 369/44.21, 44.22; 359/814, 824, 199, 200

[56] References Cited

U.S. PATENT DOCUMENTS

| | | | |
|---|---|---|---|
| 4,669,823 | 6/1987 | Iguma et al. | 359/824 |
| 4,702,555 | 10/1987 | Iguma et al. | 359/814 |
| 4,813,033 | 3/1989 | Baasch et al. | 359/824 |
| 5,018,836 | 5/1991 | Noda et al. | 359/814 |
| 5,046,820 | 9/1991 | Saekusa et al. | 359/814 |
| 5,159,482 | 10/1992 | Heinrich | 359/199 |

FOREIGN PATENT DOCUMENTS

| | | | |
|---|---|---|---|
| 58-85942 | 5/1983 | Japan | 359/824 |
| 60-136041 | 7/1985 | Japan | 359/824 |
| 63-220429 | 9/1988 | Japan | 359/824 |
| 2-121128 | 5/1990 | Japan | 359/824 |

*Primary Examiner*—Robert S. Tupper
*Assistant Examiner*—Paul J. Ditmyer
*Attorney, Agent, or Firm*—Limbach & Limbach

[57] ABSTRACT

A biaxial actuator with a first or focusing coil and a second or tracking coil wound around a bobbin and disposed opposite to a magnet, wherein the bobbin has a hollow cylindrical body and flanges formed at both ends of the cylindrical body. Coil retaining portions are formed in the flanges, and the first coil is wound around the cylindrical body, while the second coil is wound around the retaining portions, whereby accidental slip-off of the coils can be prevented. The tracking coil is wound around the retaining portions with inclination of a predetermined angle to the magnet. And both the focusing coil and the tracking coil are retained at projections formed on at least one of the flanges.

7 Claims, 3 Drawing Sheets

BIAXIAL ACTUATOR

This is a continuation of application Ser. No. 08/030,121 filed on Mar. 15, 1993 now abandoned.

BACKGROUND OF THE INVENTION

1. Field of the Invention

The present invention relates to a biaxial actuator adapted for use in a pickup device of a compact disc player or the like.

2. Description of the Background art

FIG. 3 shows an exemplary structure of a conventional biaxial actuator employed in an optical pickup device. In this known example, a cavity 2 is formed in a bobbin 1 of synthetic resin or the like for housing an objective lens 3 therein. And substantially rectangular recesses 4L, 4R are formed on both sides of the bobbin 1 so as to house focusing coils 5L, 5R therein respectively. Tracking coils 6L, 7L or 6R, 7R are bonded to the outer surface of the focusing coil 5L or 5R (on the reverse side with respect to the bobbin 1) by the use of a binder or the like. Each of the focusing coils 5L, 5R and the tracking coils 6L, 7L, 6R, 7R is shaped to be bobbinless.

Magnets 8L, 8R are disposed opposite to each other at positions outside the tracking coils 6L, 7L and 6R, 7R respectively. The magnets 8L, 8R are bonded respectively to the inner walls of outer bent portions of substantially U-shaped yokes 9L, 9R. And the inner bent portions of the yokes 9L, 9R are inserted respectively into hollows of the focusing coils 5L, 5R.

Therefore a magnetic flux generated from the magnet 8L is supplied to the inner bent portion of the yoke 9L via the inner vertical portions of the tracking coils 6L, 7L and the outer portions of the focusing coil 5L. This magnetic flux is fed back via the horizontal coupling portion of the yoke 9L to the outer bent portion thereof and further to the magnet 8L. Similarly, a magnetic flux generated from the magnet 8R is applied via the tracking coils 6R, 7R and the focusing coil 5R to the inner bent portion of the yoke 9R and then is fed back via the horizontal coupling portion of the yoke 9R to the outer bent portion thereof and further to the magnet 8R.

Consequently, when a focusing error signal is supplied to the focusing coils 5L, 5R, the bobbin 1 is driven in the focusing direction (vertically in the diagram). Meanwhile when a tracking error signal is supplied to the tracking coils 6L, 7L, 6R, 7R, the bobbin 1 is driven in the tracking direction (horizontally in the diagram). Thus a laser light beam incident on an unshown compact disc or the like via the objective lens 3 can be controlled in both focusing and tracking directions.

FIG. 4 typically illustrates the positional relationship between the magnet and the tracking coil in the known example of FIG. 3. In this example, the magnet 8R and the tracking coil 6R (or 7R) are disposed in parallel with each other. Such positional relationship is maintained also with regard to the magnet 8L and the tracking coil 6L (or 7L).

FIG. 5 shows another conventional example, wherein a focusing coil 23 is wound horizontally around a bobbin 21, and an objective lens 22 is incorporated therein. Tracking coils 24A, 24B wound to be bobbinless in advance are prepared for the bobbin 21 around which the focusing coil 23 is wound as mentioned, and hollow portions are fitted to the bobbin 21 and are bonded thereto fixedly, whereby the focusing coil 23 and the tracking coils 24A, 24B are disposed opposite to the left and right magnets 25L and 25R, respectively.

It is impossible, in this conventional example, to set a yoke in the bobbin 21, so that magnetic fluxes generated from the magnets 25L, 25R are not fed back.

In this example also, the bobbin 21 can be driven in both focusing and tracking directions by supplying a focusing error signal or a tracking error signal to the focusing coil 23 or the tracking coils 24A, 24B.

FIG. 6 typically illustrates the positional relationship between the magnet and the tracking coil in the known example of FIG. 5. In this example, the magnet 25R (and 25L) and the tracking coils 24A, 24B are so disposed as to be orthogonal to each other.

As described above, in the conventional biaxial actuator where the tracking coils 6L, 7L, 6R, 7R, 24A, 24B are wound to be bobbinless and then are bonded to the focusing coils 5L, 5R or the bobbin 21, many assembling steps need to be executed to consequently raise a problem of increase in the production cost. Furthermore, due to the bobbinless winding, it is necessary to use a self-welding wire as a coil wire with the requirement of ensuring a space for the binder, hence lowering the electromagnetic conversion efficiency. In addition, because of the bobbinless structure, a wire terminating process is not executable for the individual coil to eventually induce some difficulties in realizing automated manufacture.

OBJECT AND SUMMARY OF THE INVENTION

It is an object of the present invention to provide an improved biaxial actuator which is capable of enhancing the electromagnetic conversion efficiency and minimizing the number of required assembling steps to reduce the production cost while realizing simplified manufacture by an automatic winding machine.

According to one aspect of the present invention, there is provided a biaxial actuator where focusing coils and tracking coils wound around a bobbin are disposed opposite to magnets. The bobbin has a hollow cylindrical body and flanges formed at both ends of the cylindrical body. Notches are formed in the flanges to serve as retaining portions for the coils, and the focusing coils are wound around the cylindrical body, while the tracking coils are wound around the notches.

Since the notches are formed in the flanges, the tracking coils can be wound directly around the notches, and accidental slip-off thereof is preventable with certainty.

According to another aspect of the present invention, there is provided a biaxial actuator where focusing coils and tracking coils wound around a bobbin are disposed opposite to magnets. The bobbin has a hollow cylindrical body and flanges formed at both ends of the cylindrical body. Focusing terminals and tracking terminals in the shape of projections are provided on the flanges, and the focusing coils are wound around the cylindrical body, while the tracking coils are wound around the flanges. And the ends of the focusing coils and those of the tracking coils are retained respectively at the focusing terminals and the tracking terminals.

In this structure where the individual ends of the coils are retained at the focusing terminals and the tracking terminals respectively, the wire terminating process for each coil is facilitated to consequently realize automated production of the biaxial actuator by an automatic winding machine.

The above and other features and advantages of the present invention will become apparent from the following description which will be given with reference to the illustrative accompanying drawings.

DETAILED DESCRIPTION OF THE PREFERRED EMBODIMENT

Hereinafter an exemplary embodiment of the present invention will be described in detail with reference to the accompanying drawings.

Figure 1:
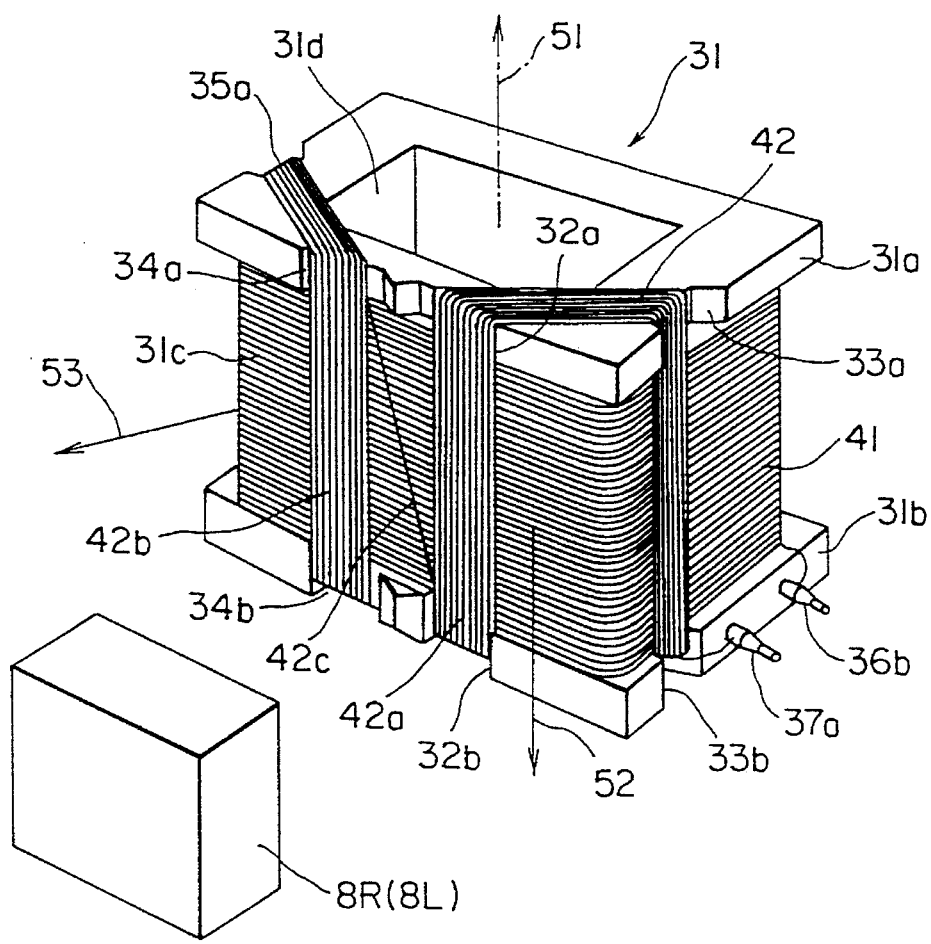
FIG. 1 is a perspective view showing the structure of an embodiment which represents the biaxial actuator of the present invention.
Figure 3:
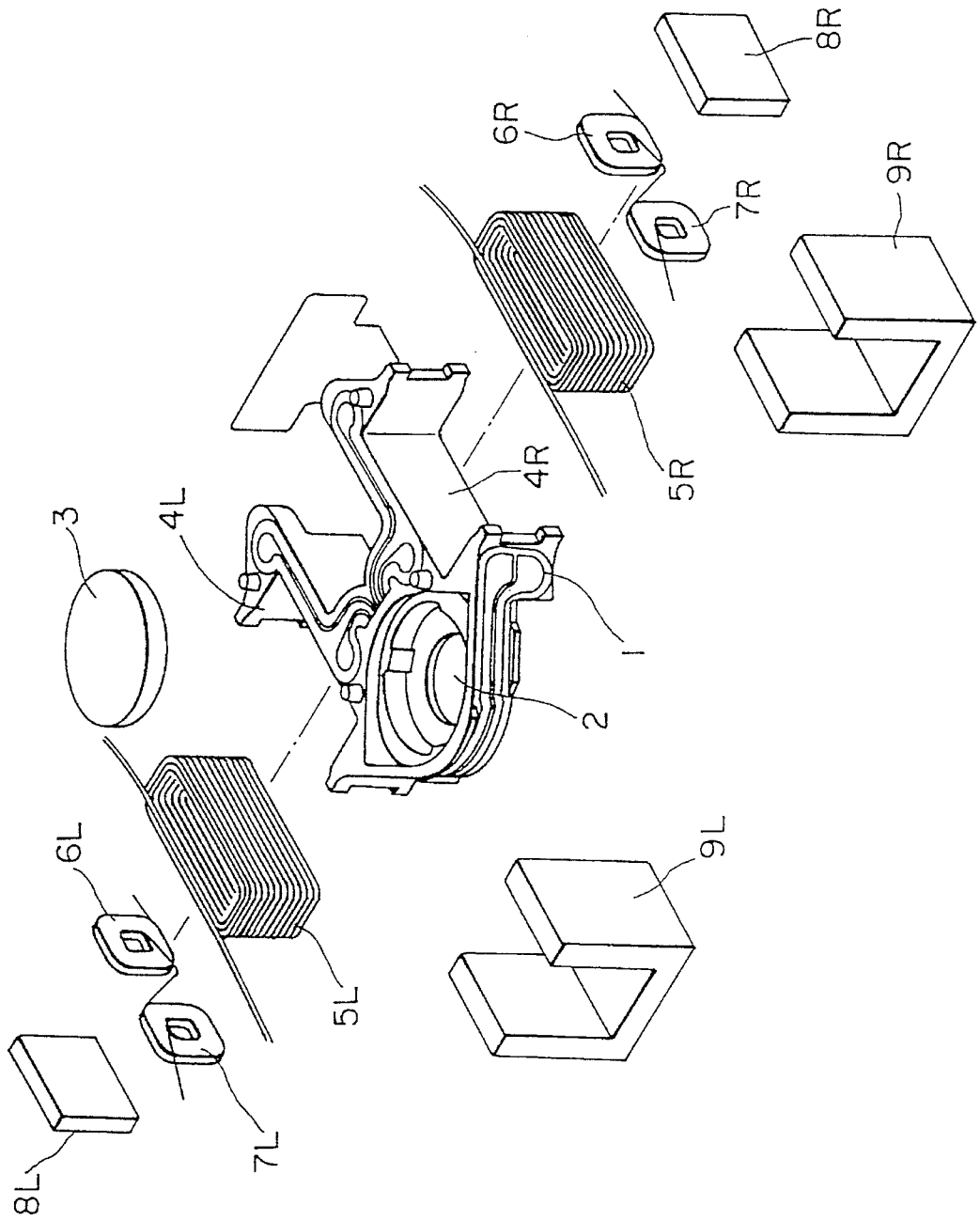
FIG. 3 is an exploded perspective view showing the structure of a conventional biaxial actuator.
Figure 4:
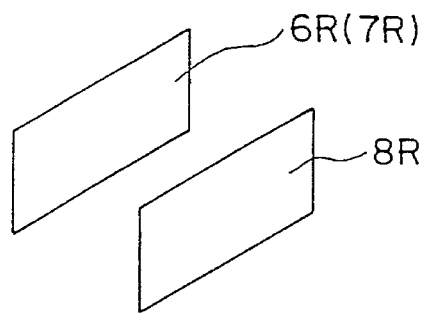
FIG. 4 is a schematic diagram for explaining the positional relationship between a magnet and a tracking coil in the example of FIG. 3.

FIG. 1 is a perspective view showing the structure of a preferred embodiment which represents the biaxial actuator of the present invention, wherein any component parts corresponding to those in the aforementioned example of FIG. 3 are denoted by the same reference numerals. In this embodiment, a bobbin 31 composed of a high molecular material such as liquid crystal polymer, epoxy resin or PBT comprises a cylindrical body 31c and flanges 31a, 31b formed at its upper and lower ends. And a hollow 31d is formed in the cylindrical body 31c. In the upper flanges 31a, notches 32a and 34a are formed on one side opposite to a magnet 8R (or 8L). And notches 33a and 35a are formed on the right and left sides respectively as viewed from the magnet 8R (or 8L). Similarly, notches 32b and 34b are formed on one side of the lower flange 31b opposite to the magnet 8R (or 8L), and notches 33b and 35b (not shown) are formed on the right and left sides as viewed from the magnet 8R (or 8L).

A focusing terminal 36b and a tracking terminal 37a are provided on the right side (as viewed from the magnet 8R (or 8L) of the lower flange 31b. Although not shown, a focusing terminal 36a and a tracking terminal 37b are provided on the left side (as viewed from the magnet 8R (or 8L) of the flange 31b. Such terminals may be composed of metal for example.

The bobbin 31 is rotated on an axis 51 at the time of winding a focusing coil 41 therearound. Then the focusing coil 41 is wound automatically around the cylindrical body 31c by an automatic winding machine. Due to the structure where the flanges 31a, 31b project outward from the cylindrical body 31c, it is effective to prevent any accidental slip-off of the focusing coil 41 from the cylindrical body 31c. The end of the focusing coil 41 is twined around the focusing terminals 36a (not shown), 36b and is soldered thereto if necessary.

Subsequently to such direct winding of the focusing coil 41 around the bobbin 31, a tracking coil 42 is wound directly around the bobbin 31 which is rotated on the axis 52. Since the axis 52 is perpendicular to the plane defined by notches 32a, 33a, 33b, 32b, the tracking coil 42 can be wound around the notches 32a, 33a, 33b, 32b by an automatic winding machine with rotation of the bobbin 31 on the axis 52. In this case also, the notches 32a through 32b exactly retain the tracking coil 42 in order to thereby prevent coil 42 from slipping off from the bobbin 31.

After a predetermined amount of the tracking coil 42 has been wound around the notches 32a through 32b, the coil 42 is guided via a crossover wire 42c toward the notch 34a. And then the bobbin 31 is rotated on an axis 53 which is perpendicular to the plane defined by notches 34a, 35a, 35b (not shown), 34b, so that the tracking coil 42 drawn out via the crossover wire 42c is wound directly around the notches 34a, 35a, 35b now shown, 34b. The end of the tracking coil 42 thus wound directly around the bobbin 31 is twined around the tracking terminals 37a, 37b (not shown) and then is soldered thereto if necessary.

The bobbin 31 with the focusing coil 41 and the tracking coil 42 wound therearound is so disposed that the tracking coil 42a, the right part (as viewed from the magnet 8R (or 8L)) of the coil 42, extending between the notches 32a, 33a, 33b, 32b, and the tracking coil 42b, the left part (as viewed from the magnet 8R (or 8L)) of the coil 42, extending between the notches 34a, 35a, 35b (not shown), 34b, are both opposed to the magnet 8R (or 8L). Namely, instead of the focusing coil 5R and the tracking coils 6R, 7R (or the focusing coil 5L and the tracking coils 6L, 7L) shown in the aforementioned example of FIG. 3, the bobbin 31 with the focusing coil 41 and the tracking coil 42 wound therearound as shown in FIG. 1 is housed in the recess 4R (or 4L) of the bobbin 1 of FIG. 3. So three is one bobbin 31 with focusing 41 and tracking 42 coils in each of the two recesses, 4R and 4L, of FIG. 3. The other structure is the same as that in the example of FIG. 3.

Consequently, the magnetic flux generated from the magnet 8R is applied via the tracking coils 42a, 42b and the focusing coil 41 to the inner bent portion of a yoke 9R. This magnetic flux is fed back via the coupling portion of the yoke 9R to the outer bent portion thereof and further to the magnet 8R. Similarly, the magnetic flux generated from the magnet 8L is applied to the yoke 9L via the tracking coils 42a, 42b and the focusing coil 41 of the bobbin 31 housed in the recess 4L. This magnetic flux is fed back to the magnet 8L via the yoke 9L.

As a result, the bobbin 1 (with the objective lens 3 incorporated therein) can be driven in the focusing direction by supplying a focusing error signal to the focusing coil 41. Similarly, the bobbin 1 (with the objective lens 3) can be driven in the tracking direction by supplying a tracking error signal to the tracking coil 42.

Figure 2:
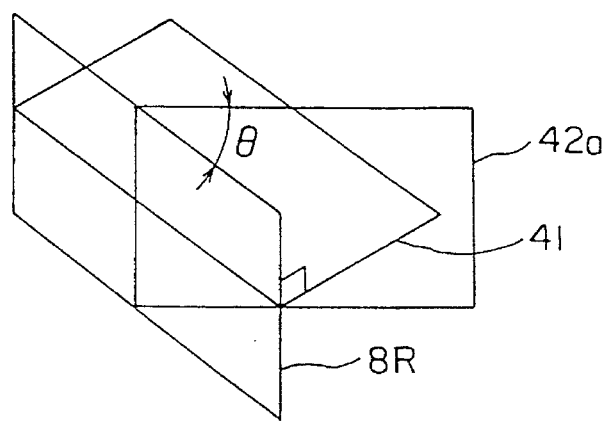
FIG. 2 is a schematic diagram for explaining the planes where a magnet, a focusing coil and a tracking coil are disposed in the embodiment of FIG. 1.

FIG. 2 typically illustrates the positions of the focusing coil and the tracking coil relative to the magnet in the embodiment. The plane of the focusing coil 41 is disposed to be perpendicular to the plane of the magnet 8R (or 8L), while the wound region inclusive of the tracking coil 42a (and 42b) is disposed with inclination of a predetermined angle $\theta$ to the magnet 8R (or 8L).

Figure 5:
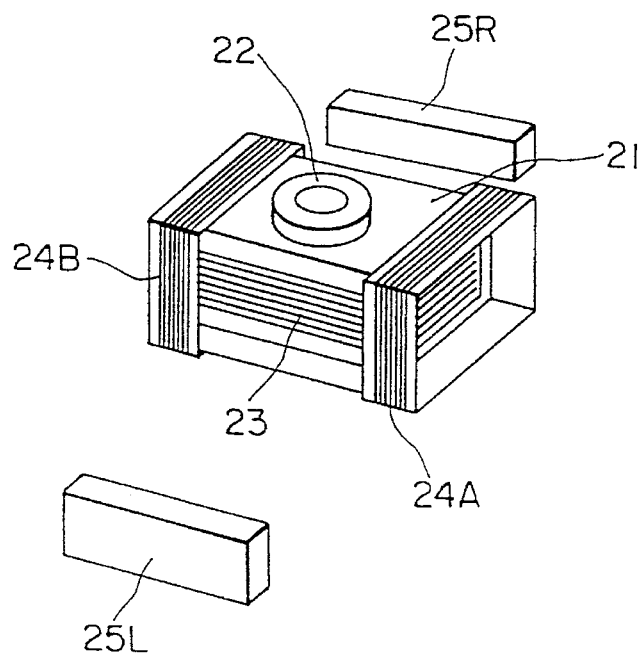
FIG. 5 is a perspective view showing the structure of another conventional biaxial actuator.
Figure 6:
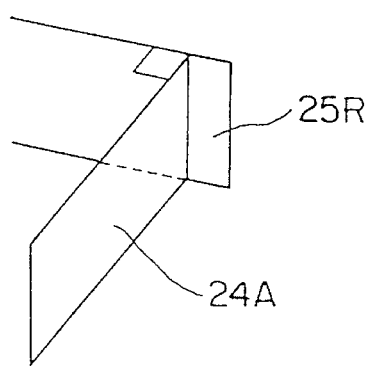
FIG. 6 is a schematic diagram showing the positional relationship between a magnet and a tracking coil in the example of FIG. 5.

It may theoretically be possible to wind the tracking coil 42 in the direction perpendicular (i.e., $\theta=90°$) to the magnet 8R (or 8L). (In this case, the structure is almost similar to the aforementioned example of FIG. 5.) However, there arises a problem that the effective length of the tracking coil 42 is rendered greater, and some difficulties are induced in the insertion of the yokes 9R, 9L into the hollow 31d of the bobbin 31. As a result, similarly to the example of FIG. 5, it becomes impossible to use yokes to consequently bring about difficulties in ensuring high-intensity magnetic fluxes. Accordingly, magnets of greater intensities are needed in comparison with the case of using yokes, whereby disadvantages are unavoidable inclusive of a dimensional increase and higher production cost. It is therefore preferred that, as in the embodiment mentioned, the tracking coil 42 be wound around the bobbin 31 with inclination of a predetermined angle θ to the magnet 8R, (or 8L).

The focusing terminals 36a (not shown), 36b and the tracking terminals 37a, 37b (not shown) may be composed of conductive metal, and the ends of the coils may be anchored thereto by soldering or the like. In addition, it is also possible to use an adequate heat-resistant resin or the like for the terminals and to twine the ends of the coils therearound. In the latter case, the ends of the coils and other leadwires may be soldered to each other at such terminals.

As described hereinabove, according to the biaxial actuator of the present invention, the cylindrical body and the retaining portions are formed in the bobbin so that the first and second coils can be wound directly around the bobbin.

Furthermore, due to the projections formed on the flanges, the ends of the coils can be properly retained thereto.

Therefore the following advantageous effects are achievable in such novel structure.

Firstly, since the structure is not bobbinless, the number of required assembling steps in manufacture is minimal.

Secondly, any coil need not be composed of a self-welding wire due to the non-bobbinless structure, and the space required in the prior art heretofore for a binder is no longer necessary to consequently enhance the electromagnetic conversion efficiency.

And thirdly, the coils can be wound directly around the bobbin, so that the winding operation can be performed by an automatic winding machine to thereby reduce the production cost.

What is claimed is:

1. A biaxial actuator comprising:

a first coil and a second coil wound around a bobbin and disposed opposite to a magnet, wherein the bobbin has a hollow body with a rectilinear cross-section and has flanges formed at the ends of the body, each flange having coil retaining portions, and the first coil is wound around the body to define a coil which has a rectilinear cross-section and which has an axis which is perpendicular to the rectilinear cross-section of the body, while the second coil is wound around the coil retaining portions, such that the second coil lies in a first plane and a second plane that both intersect and are non-orthogonal to a third plane in which the magnet lies.

2. A biaxial actuator comprising a first coil and a second coil wound around a bobbin and disposed opposite to a magnet, wherein the bobbin has a hollow rectangular body and flanges formed at the ends of the body, each flange having coil retaining portions and at least one of the flanges having projections, and the first coil is wound around the rectangular body, while the second coil is wound around the coil retaining portions; and the ends of the first and second coils are retained at the projections;

and wherein the second coil lies in a first plane and a second plane which both intersect and are non-orthogonal to a third plane in which the magnet lies.

3. The biaxial actuator according to claim 2, wherein the projections are composed of a conductive material.

4. A biaxial actuator comprising:

a focusing coil and a tracking coil wound around a bobbin and disposed opposite to a magnet;

wherein the bobbin has a hollow body and flanges formed at the ends of the body, each flange having coil retaining portions on its one side opposite to the magnet;

wherein the focusing coil is wound around the body in a manner to be perpendicular to the magnet, while the tracking coil is wound around the coil retaining portions and lies in a plane which intersects and is inclined at a predetermined angle and non-orthogonal to a plane in which the magnet lies; and wherein actuation of the focusing coil and tracking coil results in linear movement of the bobbin either in the plane of the magnet or in a plane orthogonal to the plane of the magnet.

5. The biaxial actuator according to claim 4, wherein at least one of the flanges has projections thereon, and the ends of the focusing coil and said tracking coil are retained at the projections.

6. A biaxial actuator comprising a focusing coil and a tracking coil wound around a bobbin and disposed opposite to a magnet, wherein the bobbin has a hollow rectangular body and flanges formed at the ends of the rectangular body, each flange having coil retaining portions on its one side opposite to the magnet;

and after the focusing coil is wound around the rectangular body, the tracking coil is wound around the coil retaining portions, such that the tracking coil lies in a first plane and a second plane that both intersect and are non-orthogonal to a third plane in which the magnet lies; and wherein the first and second planes intersect the focusing coil wound on the rectangular body.

7. The biaxial actuator according to claim 6, wherein at least one of the flanges has projections thereon, and the ends of the focusing coil and the tracking coil are retained at the projections.

* * * * *